Figure 1:
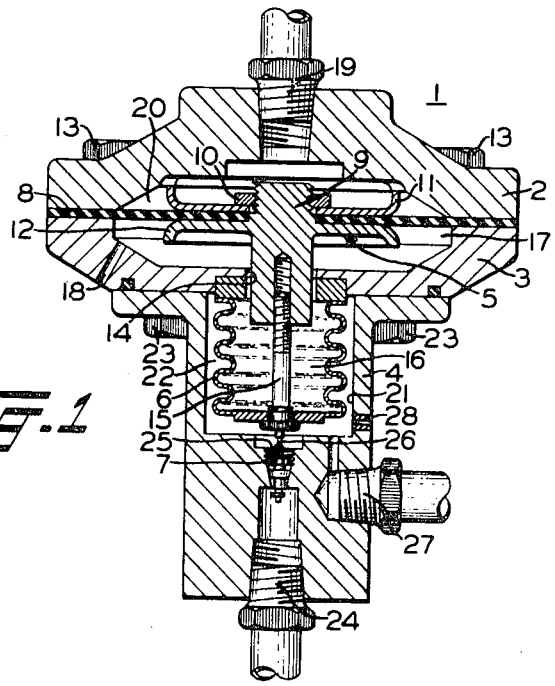

United States Patent

Allen

[15] 3,638,670
[45] Feb. 1, 1972

[54] LOW TO HIGH FLUID PRESSURE INTERFACE APPARATUS

[72] Inventor: Clifford W. Allen, Lexington, Ky.
[73] Assignee: Westinghouse Air Brake Company, Wilmerding, Pa.
[22] Filed: Mar. 25, 1970
[21] Appl. No.: 22,562

[52] U.S. Cl. .................................137/81.5, 137/85
[51] Int. Cl. .................................F15c 1/14, F15c 3/04
[58] Field of Search.................137/82, 85, 84, 86, 81.5; 235/200 PF

[56] References Cited

UNITED STATES PATENTS

| | | | |
|---|---|---|---|
| 2,584,455 | 2/1952 | Hughes | 137/85 |
| 2,302,014 | 11/1942 | Fausek | 137/85 |
| 3,181,432 | 5/1965 | Puster | 137/85 X |
| 3,460,554 | 8/1969 | Johnson | 137/81.5 X |
| 3,393,692 | 7/1968 | Geary | 137/81.5 X |
| 3,467,123 | 9/1969 | Perkins | 137/81.5 |
| 3,474,814 | 10/1969 | Sher | 137/81.5 |

Primary Examiner—Alan Cohan
Attorney—Ralph W. McIntire, Jr.

[57] ABSTRACT

A piloted low to high pressure analog interface valve device is provided having a gain factor determined by the area relationship of a diaphragm piston subject to a differential control force and a bellows connected to the piston and subject to delivery pressure acting in a direction opposite to the control force. A two-way, metering-type supply valve controlled by movement of the piston/bellows assembly is adapted to control the supply of fluid pressure to delivery. A bleed port continuously vents delivery chamber pressure which is established at a value determined by the valve gain factor and which is maintained against the bleed by metering action of the supply valve when the piston/bellows assembly stabilizes at some intermediate position as determined by the point at which the rate of supply pressure being metered to the delivery is able to precisely match the rate of bleed. The interface valve is also adapted to be driven by the differential outputs of a pure fluid proportional amplifier to further increase the overall gain of the interface. Valve performance may be improved at the expense of gain through a feedback signal corresponding to delivery pressure connected to oppose the control signal at the fluid amplifier.

4 Claims, 3 Drawing Figures

PATENTED FEB 1 1972 3,638,670

INVENTOR.
CLIFFORD W. ALLEN
BY Ralph W. McIntire Jr.
ATTORNEY

LOW TO HIGH FLUID PRESSURE INTERFACE APPARATUS

BACKGROUND OF THE INVENTION

Small, pure-fluid-type components known as "fluidic" devices are now being utilized in devising control systems once considered the domain of electronics. Having no moving parts and being substantially insensitive to environmental conditions, these "fluidic" devices are more rugged than their electronic counterparts and exhibit such other outstanding features as miniaturization, fast response and long maintenance-free service life. Typically, the range of pressures at which these pure fluid devices operate is relatively low, varying in value between 0–10 p.s.i. in most applications. When used in control systems where considerable output force is required, such as for operating pneumatic force actuators or power cylinders and the like, the low "fluidic" pressure must be converted to a more usable level, often on the order of 80 to 100 p.s.i. or more without appreciable loss of stability, response or linearity.

Due to their high gain characteristic, diaphragm operated three-way valve devices, which are commonly employed to amplify low pressure signals are known to exhibit poor stability, which is critical in sensitive control system. In attempting to improve gain stability, other desirable operating characteristics such as linearity, repeatability and hysteresis are found to suffer.

SUMMARY OF THE INVENTION

It is therefore the object of this invention to provide a high gain, analog-type low to high pressure interface valve device having good gain stability, as well as good linearity, repeatability and minimal hysteresis.

It is another object of the invention to drive the interface valve from the differential outputs of a pure-fluid-proportional-type amplifier to further increase gain.

It is still another object of the invention to provide means for adjusting amplifier gain to achieve greater gain stability.

These objectives and other features of the invention are achieved by providing a basic interface valve device comprising a piston assembly adapted to cooperate with the valve body to form first, second and third chambers, and a two-way, metering-type supply valve controlled by movement of the piston assembly. The piston assemblage comprises a diaphragm-type piston to which is secured, by a screw-threaded adjusting rod, the closed end of a bellows having its open end sealingly connected to the valve body. The exterior of the bellows is subjected to delivery pressure in the second chamber when the piston assemblage is deflected in a direction to open the supply valve to thereby oppose the control force tending to open the valve. A bleed port continuously vents delivery pressure at a restricted rate. When delivery pressure is developed at a value corresponding to the force deflecting the piston assemblage and the valve gain factor, the piston assemblage will stabilize in a position in which metering action of the supply valve will maintain the delivery bleed.

In the first embodiment of the invention, control pressure is connected to the first chamber where it acts on the face of the piston while the third chamber formed within the bellows and the area under the piston is maintained at atmospheric pressure so that the gain factor is determined by the area ratio of the bellows and diaphragm piston.

In the second embodiment, the differential outputs of a pure-fluid-proportional-type amplifier are connected to the first and third chambers. Equal pressure is developed at each output when no pressure signal is present at the amplifier control port. Application of a low-pressure control signal at the amplifier results in a pressure increase in the corresponding amplifier output and a pressure decrease by a like amount in the opposite output. This creates a differential output for controlling the piston assemblage with the delivery pressure at the interface output reflecting the gain characteristic of both the fluid amplifier and the basic interface valve.

In a third embodiment, a feedback loop is provided for connecting a signal corresponding to delivery pressure back to the fluid amplifier via a variable fluid flow restrictor. The feedback signal opposes the fluid amplifier control signal to adjust the differential output. By varying the size of the fluid flow restriction, a convenient means is provided for adjusting the overall gain of the amplifier/interface combination to improve its performance. Increasing the feedback signal by increasing the restriction size reduces the amplifier gain, while decreasing the feedback signal by reducing the restriction size increases the gain.

Figure 2:
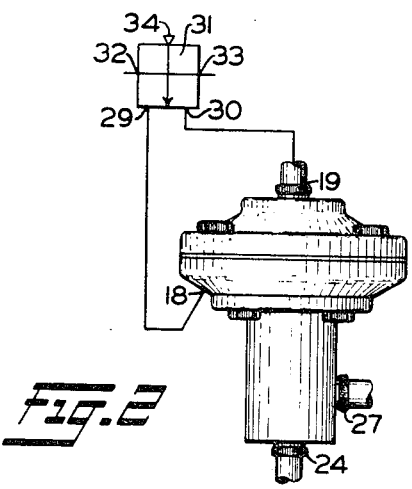
Figure 3:
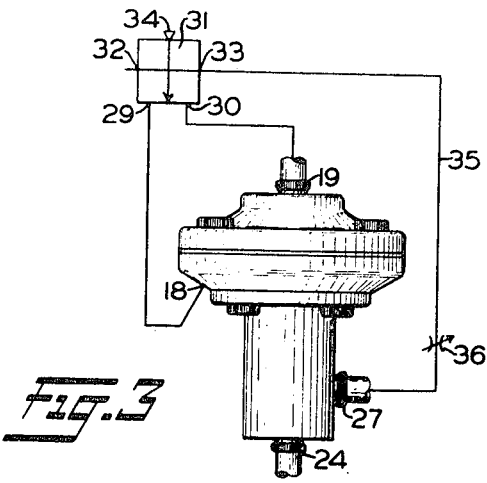

These and other objects and features of the invention will become apparent in the following more detailed description when considered with the drawings, in which:

FIG. 1 is a sectional view in elevation showing the assembly of the basic interface valve comprising the invention, FIG. 2 is a diagrammatic view of a second embodiment of the invention in which the basic interface valve is shown with a pure fluid amplifier control element, and FIG. 3 is a diagrammatic view of a third embodiment of the invention comprising a variation of the interface/amplifier combination of FIG. 2.

Referring now to FIG. 1 of the drawings, a low to high pressure interface valve device 1 is provided comprising a body casing separated into a plurality of segments 2, 3 and 4, a piston abutment 5, a conventional convoluted-type bellows 6 adapted to extend and contract in response to movement of the piston abutment, and a supply valve 7.

Piston abutment 5 is comprised of a flat, short travel type diaphragm 8 adapted to carry a hub member 9 within an opening at its midpoint. A locknut 10 having a screw-threaded engagement with the hub 10 secures the inner periphery of diaphragm 8 between an annular ring 11 and a diaphragm follower 12 integral with hub member 9. The outer periphery of diaphragm 8 is clamped between body portions 2 and 3 which are held together by suitable screws 13.

A central opening 14 is provided in body segment 3 coaxial with piston abutment 5 to accommodate axial movement of the piston abutment. Soldered, press fit, or otherwise secured about opening 14 is the open end of bellows 6 which has its closed end connected by an elongated threaded screw 15 to the portion of hub 9 extending through opening 14 so as to expand or contract with reciprocation of piston abutment 5. The length of threaded screw 15 may be adjusted to provide more or less extension of the bellows 6 relative to body segment 3, as desired, in order to vary the bias on piston abutment 5.

In addition to exerting an upward spring bias on piston abutment 5, bellows 6 also defines a pressure chamber 16 within the bellows that is intercommunicated via opening 14 with a pressure chamber 17 defined by piston abutment 5 and body segment 3. A port connection 18 in body segment 3 admits atmospheric pressure to chambers 16 and 17 while a port connection 19 in body segment 2 is communicated with a chamber 20 defined by piston abutment 5 and body segment 2.

Body segment 4 is formed with an annular recessed cavity 21 within which the bellows 6 is sealingly housed to define a chamber 22 between the convoluted annular wall of the bellows and the wall of cavity 2 when the body segment 4 is secured to segment 3 by suitable screws 23. A port connection 24 in body segment 4 is provided with a threaded counterbore 25 for adjustably receiving supply valve 7. Appropriate seals provided with valve 7 limit fluid pressure flow communication between port connection 24 and chamber 22 only by way of the internal valving of valve 7. Supply valve 7 may be any suitable two-way-type valve device capable of metering the flow of fluid pressure in accordance with the degree of movement imparted to the operating stem of the valve. For purposes of conveniently disclosing the invention, a common automotive-type tire valve is shown, although other style valves of the same general type may also be applicable. With the piston abutment 5 supported in its uppermost position by the inherent spring action of bellows 6, as shown, the valve element 7 is positioned in counterbore 25 so that its operating stem 26 just engages the head of screw 15. A port connection 27 in body segment 4 is communicated with chamber 22 while a bleed port 28 also in body segment 4 communicates chamber 22 with atmospheres.

In considering the basic operation of the above-described relay valve device 1, it will be assumed that pressurization of chamber 20 occurs by supply of low fluid pressure to port connection 19. This results in deflection of piston abutment 5 its full travel in a downward direction, it being understood that chambers 16 and 17 are exposed to atmospheric pressure by way of port 18. Being at all times in contact with the head of screw stem 15, it will be apparent that valve stem 26 is immediately depressed upon deflection of piston abutment 5, thereby opening supply valve 7 to accommodate flow of high fluid pressure supply at port connection 24 to chamber 22 and thence to delivery via port connection 27. At the same time as delivery pressure is building up, bleed port 28 is venting the delivery pressure to atmosphere at a restricted rate. Delivery pressure in chamber 22 acts upon the relatively small pressure sensing area on the external surface of bellows 6 to oppose control pressure in chamber 20 acting on piston abutment 5, thus tending to force the piston abutment back toward its initial upward position. As the forces across piston abutment 5 become subsequently balanced, supply valve 7 will assume a setting, as dictated by the position of piston abutment in which the bleed of pressure from chamber 22 to atmosphere via bleed port 28 is maintained by the metering action of valve 7, to thereby establish and maintain the desired delivery pressure in accordance with the force ratio between the piston abutment 5 and the bellows 6. This setting of supply valve 7 will, of course, vary depending upon the delivery pressure obtained since the bleed rate is dependent upon the pressure established in chamber 22. In any event, automatic regulation is assured without the valve supply being terminated as with three-way-type valve functions. The device is thus more responsive to changes in control pressure due in part to the fact that a dynamic flow condition is maintained and also to the fact that sliding seals are eliminated by use of the bellows.

Should control pressure effective in chamber 20 now be reduced, the downward force on piston abutment 5 will consequently be reduced to upset the force balance between the piston abutment and bellows. Valve 7 will accordingly meter less pressure to chamber 22 and port connection 27 as the force imbalance moves the piston abutment toward its initial upward position. Due to the reduced flow of supply pressure to chamber 22, bleed port 28 now vents the excess delivery pressure by way of port connection 27 and chamber 22 until the feedback pressure in delivery chamber 22 acting on the sensing area of the bellows is reduced enough to restore the force balance controlling movement of the piston abutment 5. In this new position, the flow rate metered by valve 7 supplies the exact rate of flow necessary to balance the pressure loss due to pressure venting through bleed port 28 so as to maintain the desired delivery pressure at port connection 27 in accordance with the force ratio of the piston abutment and bellows and the effective control pressure.

Shown in FIG. 2 of the drawings is the basic analog interface valve device 1 having its port connections 18 and 19 communicated with the outputs 29 and 30 respectively of a conventional pure-fluid-proportional-type amplifier 31. The pressure differential across a pair of opposing control ports 32 and 33 acts on the power stream supplied from a regulated source of supply via port 34 so as to pressurize the outputs 29 and 30 accordingly.

In the absence of a control signal or when equal fluid pressure control signals are present at fluid amplifier ports 32 and 33, the power supply is split substantially equally between outputs 29 and 30, thus supplying chambers 16, 17 and 20 with equal pressure. The differential area of the piston abutment 5 and bellows 6, upon which these pressures act, results in a control force differential developing in a downward direction. Proper adjustment of screw 15 will extend the bellows sufficiently to bias the piston abutment upward to counteract this initial downward force differential and thereby maintain the piston abutment 5 in its upper position in which supply valve 7 is closed.

Providing a control signal at amplifier control port 32 without a corresponding signal being provided at port 33 deflects the power stream so that a pressure differential proportional to the control differential is established between outputs 29 and 30, with output 30 having the predominate pressure. This results is a pressure increase in chamber 20 and a corresponding pressure reduction in chamber 19 to upset the force balance across the piston abutment 5 and bellows 6. Piston abutment 5 is consequently forced downward, opening supply valve 7 to initially establish full flow of supply pressure to chamber 22 and port connection 27. As previously explained, the piston abutment will seek a position in which the rate of bleed of pressure from chamber 22, when the desired delivery pressure therein is established, is maintained by the rate at which the supply valve 7 meters supply pressure to chamber 22.

Subsequently reducing the control signal at amplifier 31 after the piston abutment is stabilized when a force balance is achieved, results in a force imbalance being created to drive the piston abutment toward its upper position, reducing the supply of pressure metered to delivery chamber 22 and port connection 27. Consequently, bleed port 28 vents pressure from delivery chamber 22 at a rate faster than it is being metered thereto by valve 7, thereby reducing delivery pressure at port connection 27 to a value corresponding to the control force differential acting on piston abutment 5. At this reduced value of delivery pressure, the bleed rate will be accordingly reduced and the piston abutment will find a new position in which the supply valve will be opened just sufficient to maintain the bleed rate.

The overall gain achieved by the fluid amplifier/interface valve combination of FIG. 2 is thus increased over the gain of the basic interface valve of FIG. 1 by the gain factor of the particular pure fluid amplifier employed.

While it was assumed in the above explanations that chambers 16 and 17 were maintained at atmospheric pressure (FIG. 1) or low fluid pressure (FIG. 2) for operating the interface, the purpose being to provide a pressure gain at the delivery, it will be apparent that the device may also be operated by applying high-pressure control signals to port connection 18 and to port connection 19 from separate sources. Consequent pressurization of chambers 16 and 17 as well as chamber 20 creates a control force differential for operating the interface valve 1 in the same manner as previously described. In this respect, the analog interface valve could function as a comparator by pressurizing port connection 18 in accordance with some output function being controlled by delivery pressure at port connection 27. The difference between the control signal at port connection 19 and feedback signal at port connection 18 would then determine the level of delivery pressure developed at port connection 27, subject of course to the gain characteristic of the interface valve.

The arrangement of FIG. 2 may be still further modified by providing a feedback signal at fluid amplifier control port 33 for the purpose of counteracting the control signal at opposing control port 32. As shown in FIG. 3, a feedback line 35 connects delivery pressure at port connection 27 to the amplifier control port 33 via a variable fluid flow restrictor 36. This external feedback loop provides a convenient means for adjusting the gain of the fluid amplifier for the purpose of improving stability, since, as in all closed loop control systems, stability and response may be improved at the expense of gain.

The operation of the arrangement in FIG. 3 is such that delivery pressure established at port connection 27 and effective at the fluid amplifier control port 33 by way of restrictor 36 constrains the fluid amplifier output differential at a value at which any further increase in delivery pressure will tend to drive the amplifier in a direction to reduce delivery pressure and any further decrease in delivery pressure due to a change in the amplifier output differential tends to increase delivery pressure so that a balanced condition is maintained. Any change in control pressure at amplifier control port 32 in either a positive or negative going direction calls for a new delivery pressure which is constrained by the closed loop feedback control at a value somewhat below that which would be otherwise provided by the FIG. 2 arrangement under comparable control pressures.

The value of delivery pressure obtained may be controlled by varying the feedback restrictor 36 to accordingly vary the gain of amplifier 31. The less flow restriction provided by variable restrictor 36, the greater the feedback signal at amplifier port 33 and consequently, the smaller amplifier gain that is achieved; conversely, the greater the restriction, the smaller the feedback signal and consequently, the greater the amplifier gain. A secondary benefit of the feedback signal, not to be overlooked, is the advantage of increasing the maximum signal that the amplifier is able to handle due to the feedback signal preventing early amplifier saturation.

In each of the above arrangements, the overall gain between the control signal at the input and the high-pressure output is considerable, being attained with fast response, with a minimum of hysteresis, and with excellent repeatability in spite of the high pressure gain. For signalling purposes, the interface valve capacity is considered sufficient; however, where greater capacity is desired for control purposes, a conventional 1:1 ratio relay valve having the desired capacity should follow the interface valve. It should also be noted that any nonlinearity in the amplifier/interface output signal is attributed almost entirely to the fluidic amplifier. Where linearity is essential to a particular control function, the fluidic amplifier may be biased so as to operate in a more linear region of its operating curve, as is well known in the art.

Having now described the invention, what I claim as new and desire to secure by Letters Patent, is:

1. An analog relay valve device comprising in combination:
   a. a casing,
   b. a differential piston assemblage having cooperative relationship with said casing to define first, second and third chambers, said assemblage comprising:
      i. a piston abutment including a diaphragm sealingly secured to said casing to separate said first and second chambers, said abutment being movable in accordance with the effective pressure differential between said first and second chambers,
      ii. a resilient bellows secured to said casing to separate said second and third chambers, said bellows being expanded and contracted in accordance with the effective pressure differential between said second and third chambers, said third chamber having an inlet, a bleed port, a delivery port, and
      iii adjustable means connecting said bellows with said piston abutment, said adjustable means providing initial deformation of said bellows to a stressed condition biasing said piston assemblage in a preselected direction, and
   c. valve means engageable with said bellows for controlling the rate of supply of fluid pressure at said inlet to said third chamber responsive to movement of said piston assemblage in a direction opposite said preselected direction, said piston assemblage being urged in said preselected direction in accordance with pressurization of said third chamber.

2. The combination, as recited in claim 1, further comprising pure fluid proportional amplifier means having a first output connected to said first chamber and a second output connected to said second chamber and a pair of opposing control ports for varying fluid pressure at said outputs in accordance with the pressure differential between said control ports to provide a control pressure differential urging said piston abutment in a direction opposite said preselected direction.

3. An analog relay valve device comprising in combination:
   a. a casing,
   b. a differential piston assemblage having cooperative relationship with said casing to define first, second and third chambers, said third chamber having an inlet, a bleed port and a delivery port,
   c. pure fluid proportional amplifier means having a first output connected to said first chamber to urge said piston assemblage in a first direction, a second output connected to said second chamber to urge said piston assemblage in a second direction and a pair of opposing control ports for varying fluid pressure at said outputs proportionate to the pressure differential between said control ports such that one of said first and second chambers is pressurized and the other is depressurized by like amounts to provide a control pressure differential urging said piston assemblage in one of said first and second directions, and
   d. valve means engageable with said piston assemblage for controlling the rate of flow of fluid pressure from said inlet to said third chamber, said piston assemblage being urged in the other of said first and second directions in accordance with fluid pressure effective in said third chamber, said delivery port being connected to one of said control ports to regulate said proportional amplifier in a sense to reduce said control pressure differential in accordance with the degree of pressurization of said third chamber.

4. The combination, as recited in claim 3, further characterized in that said delivery port is connected to one of said control ports to regulate said proportional amplifier in a sense to reduce said control pressure differential in accordance with the degree of pressurization of said third chamber.

* * * * *

PO-1050
(5/69)

UNITED STATES PATENT OFFICE
CERTIFICATE OF CORRECTION

Patent No. 3,638,670      Dated February 1, 1972

Inventor(s) Clifford W. Allen

It is certified that error appears in the above-identified patent and that said Letters Patent are hereby corrected as shown below:

Column 6, line 47, numeral "3" should be --1--

Signed and sealed this 14th day of November 1972.

(SEAL)
Attest:

EDWARD M. FLETCHER, JR.
Attesting Officer

ROBERT GOTTSCHALK
Commissioner of Patents